(12) United States Patent
Park et al.

(10) Patent No.: US 9,204,429 B2
(45) Date of Patent: Dec. 1, 2015

(54) METHOD AND APPARATUS FOR ADJUSTING HARQ TIMING

(71) Applicant: Electronics and Telecommunications Research Institute, Daejeon (KR)

(72) Inventors: Jisoo Park, Daejeon (KR); Sook Jin Lee, Daejeon (KR); Youn Ok Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

(21) Appl. No.: 13/837,965

(22) Filed: Mar. 15, 2013

(65) Prior Publication Data

US 2013/0308464 A1 Nov. 21, 2013

(30) Foreign Application Priority Data

May 18, 2012 (KR) .......................... 10-2012-0053316

(51) Int. Cl.
*H04W 72/04* (2009.01)
*H04L 1/08* (2006.01)
*H04L 1/18* (2006.01)

(52) U.S. Cl.
CPC ............. *H04W 72/0406* (2013.01); *H04L 1/08* (2013.01); *H04L 1/1854* (2013.01); *H04L 1/1896* (2013.01)

(58) Field of Classification Search
USPC ................................................. 370/329, 241
See application file for complete search history.

(56) References Cited

U.S. PATENT DOCUMENTS

| 2009/0181689 | A1 | 7/2009 | Lee et al. | |
|---|---|---|---|---|
| 2009/0276676 | A1 | 11/2009 | Lee et al. | |
| 2010/0023831 | A1* | 1/2010 | Kim et al. | 714/748 |
| 2010/0211845 | A1* | 8/2010 | Lee et al. | 714/749 |
| 2011/0211522 | A1* | 9/2011 | Chung et al. | 370/315 |
| 2012/0176887 | A1* | 7/2012 | Mcbeath et al. | 370/216 |
| 2012/0230273 | A1* | 9/2012 | He et al. | 370/329 |
| 2013/0272169 | A1* | 10/2013 | Wang et al. | 370/280 |

FOREIGN PATENT DOCUMENTS

| KR | 10-2009-0005467 | 1/2009 |
|---|---|---|
| KR | 10-2009-0078723 | 7/2009 |
| KR | 10-2009-0078724 | 7/2009 |
| KR | 10-2009-0078727 | 7/2009 |
| KR | 10-2009-0078731 | 7/2009 |
| KR | 10-2009-0114802 | 11/2009 |
| WO | 2009/008635 A1 | 1/2009 |

* cited by examiner

*Primary Examiner* — Yemane Mesfin
*Assistant Examiner* — Jeff Banthrongsack
(74) *Attorney, Agent, or Firm* — Nelson Mullins Riley & Scarborough LLP (57) ABSTRACT

A method for adjusting a hybrid automatic repeat request (HARQ) timing is provided. A base station adjusts a HARQ timing of a mobile station according to a system environment, and transmits radio resource allocation information including the adjusted HARQ timing information to the mobile station. The mobile station adjusts HARQ timing according to HARQ timing information, and transmits a HARQ signal according to the adjusted HARQ timing.

8 Claims, 11 Drawing Sheets

METHOD AND APPARATUS FOR ADJUSTING HARQ TIMING

CROSS-REFERENCE TO RELATED APPLICATION

This application claims priority to and the benefit of Korean Patent Application No. 10-2012-0053316 filed in the Korean Intellectual Property Office on May 18, 2012, the entire contents of which are incorporated herein by reference.

BACKGROUND OF THE INVENTION (a) Field of the Invention

The present invention generally relates to a method and apparatus for adjusting hybrid automatic repeat request (HARQ) timing.

(b) Description of the Related Art

A wideband wireless access system, as a next-generation wireless communication scheme, supports a HARQ process in order to ensure high speed data packet transmission, reduce delay, and secure reliability of communication, and adopts a multi-input multi-output (MIMO) technique using multiple transmission antennas and multiple reception antennas in order to improve data transmission/reception efficiency.

According to the HARQ scheme, a receiver decodes a data packet received by a physical layer and determines whether there is an error, and when no error is detected, the receiver transmits an ACK (acknowledgement) signal as a response signal to a transmitter to inform the transmitter about the successful reception of the data packet. Meanwhile, if the receiver detects an error upon decoding the received data packet, the receiver transmits a NACK (negative acknowledgement) signal as a response signal to the transmitter to inform the transmitter about the detected error. Upon receiving the NACK signal, the transmitter may re-transmit a data packet.

A HARQ protocol is classified into a synchronous HARQ and an asynchronous HARQ scheme according to a transmission timing of a retransmission packet. In the synchronous HARQ scheme, transmission timing of a retransmission packet with respect to an initial transmission packet is uniformly fixed, and in the asynchronous HARQ scheme, transmission timing of a retransmission packet with respect to an initial transmission packet is determined by a scheduler of a base station.

The HARQ scheme may also be classified into an adaptive HARQ scheme and a non-adaptive HARQ scheme according to a change in an amount and position of allocated resources. The adaptive HARQ scheme is a scheme of changing an amount and position of allocated resources, and the non-adaptive HARQ scheme is a scheme of fixing an amount and position of allocated resources.

A high scheduling gain and high speed data transmission effect can be obtained by appropriately mixing the synchronous and asynchronous HARQ schemes and the adaptive and non-adaptive HARQ schemes and using small signaling overhead. For example, a mobile communication system may apply the adaptive, asynchronous HARQ to downlink (DL) data transmission, and the synchronous HARQ to uplink (UL) data transmission.

In a wireless communication system, in general, a base station schedules radio resources used in data transmission with respect to uplink and downlink. Here, a transmission time interval (TTI) is used as a transmission time unit. The TTI is a transmission duration of a physical layer with respect to an encoded packet in a radio air interface, which is expressed in the form of a slot or integer number of a subframe. That is, a TTI is a transmission duration of a packet occupying one slot or subframe length, and n TTI is a transmission duration of a subpacket (i.e., a data packet or data burst) by n slots or subframe lengths.

An existing wireless access system follows a scheme in which a HARQ signal is transmitted and received between a base station and a mobile station by using fixed transmission/reception timing irrespective of a radio channel state, characteristics of a service flow (quality of service (QoS), priority, or the like), a HARQ buffer state, or a system load state.

Such fixed transmission/reception timing may implement a simple system but it cannot satisfy QoS of traffic according to characteristics of various services. For example, when real-time traffic such as real-time video streaming or the like, and best effort (BE) traffic such as an e-mail or the like, are mixed, if resource allocation of real-time traffic sensitive to delay is interfered with by a retransmission of BE traffic, QoS will be lowered.

Also, when BE traffic is required to be retransmitted, it may be better for the BE traffic to maintain a more flexible retransmission time in comparison to real-time traffic, in order to provide better priority to the real-time traffic having high priority. Retransmission timing of a service flow having lower priority may be induced to be delayed according to a HARQ buffer state of a mobile station to increase available radio resources, whereby traffic of a service flow having higher priority may be preferentially processed to increase QoS.

Thus, when a mobile station provides various types of traffic simultaneously, packet transmission is required to be controlled according to a radio channel state of the mobile station, characteristics of a service flow, management of a HARQ buffer state, allocation and availability of radio resources, a system load, and the like. A base station is required to effectively use radio resources by controlling traffic transmission/reception timing of each service flow in consideration of a radio channel state, characteristics of a service flow, management of a HARQ buffer state, allocation of radio resources, a system load, and the like.

SUMMARY OF THE INVENTION

An aspect of the present invention provides a method and apparatus for adaptively adjusting HARQ timing according to a system environment.

Another aspect of the present invention provides a method for adjusting HARQ timing by a base station. The method includes adjusting HARQ timing of a mobile station according to a system environment, transmitting a radio resource allocation signal including the adjusted HARQ timing information, and receiving from the mobile station a HARQ signal transmitted according to the HARQ timing information.

The method may further include measuring, by the base station, the system environment.

The method may further include receiving information regarding the system environment measured by the mobile station from the mobile station.

The radio resource allocation signal may include downlink radio resource allocation information, and the HARQ signal may include a HARQ feedback signal with respect to a downlink HARQ data packet.

The HARQ timing information may include a transmission timing offset, and the HARQ feedback signal may be transmitted in a frame having a frame index that is changed by the transmission timing offset from a frame index of a transmission time before being adjusted.

The radio resource allocation signal may include uplink radio resource allocation information, and the HARQ signal may include an uplink HARQ data packet.

The HARQ timing information may include a transmission timing offset, and the HARQ data packet may be transmitted in a frame having a frame index that is changed by the transmission timing offset from a frame index of a transmission time before being adjusted.

The method may further include transmitting a HARQ feedback signal indicating a decoding failure of the HARQ data packet to the mobile station, and receiving a HARQ data packet retransmitted by the mobile station. The HARQ data packet may be retransmitted in a frame having a frame index that is changed by the transmission timing offset from a frame index of a retransmission time before being adjusted.

Yet another aspect of the present invention provides a method for adjusting HARQ timing by a mobile station. The method includes receiving from a base station a radio resource allocation signal including HARQ timing information that is adjusted according to a system environment, adjusting HARQ timing according to the HARQ timing information, and transmitting to the base station a HARQ signal according to the adjusted HARQ timing.

The system environment may be measured by the base station.

The method may further include measuring the system environment, and transmitting information regarding the system information to the base station.

The radio resource allocation signal may include downlink radio resource allocation information, and the HARQ signal may include a HARQ feedback signal with respect to a downlink HARQ data packet.

The HARQ timing information may include a transmission timing offset, and the mobile station may transmit the HARQ feedback signal in a frame having a frame index that is changed by the transmission timing offset from a frame index of a transmission time before being adjusted.

The radio resource allocation signal may include uplink radio resource allocation information, and the HARQ signal may include an uplink HARQ data packet.

The HARQ timing information may include a transmission timing offset, and the mobile station may transmit the HARQ data packet in a frame having a frame index that is changed by the transmission timing offset from a frame index of a transmission time before being adjusted.

The method may further include receiving a HARQ feedback signal indicating a decoding failure of the HARQ data packet from the base station, and retransmitting the HARQ data packet. The mobile station may retransmit the HARQ data packet in a frame having a frame index that is changed by the transmission timing offset from a frame index of a retransmission time before being adjusted.

Still another aspect of the present invention provides an apparatus for adjusting HARQ timing, and the apparatus includes a HARQ timing determiner, a transmitter, and a receiver. The HARQ timing determiner may adjust HARQ timing of a mobile station. The transmitter may transmit a downlink radio resource allocation signal including the adjusted HARQ timing information and a downlink HARQ data packet to the mobile station. The receiver may receive a HARQ feedback signal with respect to the downlink data packet that is transmitted according to the HARQ timing information from the mobile station.

In an apparatus for adjusting HARQ timing according to another aspect of the present invention, a HARQ timing determiner may adjust HARQ timing of the mobile station according to a system environment. Further, a transmitter may transmit an uplink radio resource allocation signal including the adjusted HARQ timing information to the mobile station, and a receiver may receive an uplink data packet that is transmitted according to the HARQ timing information from the mobile station.

Further aspect of the present invention provides an apparatus for adjusting HARQ timing, and the apparatus includes a HARQ timing adjuster, a transmitter, and a receiver. The receiver may receive a downlink radio resource allocation signal including HARQ timing information that is adjusted according to a system environment, and a downlink HARQ data packet from a base station. The HARQ timing adjuster may adjust HARQ timing according to the HARQ timing information. The transmitter unit may transmit to the base station a HARQ feedback signal with respect to the downlink HARQ data packet according to the HARQ timing.

In an apparatus for adjusting HARQ timing according to another aspect of the present invention, a receiver may receive a downlink radio resource allocation signal including adjusted HARQ timing information that is adjusted according to a system environment from a base station. A HARQ timing adjuster may adjust HARQ timing according to the HARQ timing information, and a transmitter may transmit to the base station an uplink HARQ data packet according to the adjusted HARQ timing.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a mobile station (MS) may refer to a terminal, a mobile terminal (MT), a mobile station (MS), an advanced mobile station (AMS), a high reliability mobile station (HR-MS), a subscriber station (SS), a portable subscriber station (PSS), an access terminal (AT), user equipment (UE), or the like, and may include an entirety or a portion of functions of the terminal, MT, AMS, HR-MS, SS, PSS, AT, UE, and the like.

Also, a base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, an HR-RS serving as a base station, an HR-RS serving as a base station, and the like, and may include the entirety or a portion of functions of the ABS, node B, eNodeB, AP, RAS, BTS, MMR-BS, RS, HR-RS, and the like.

Figure 1:
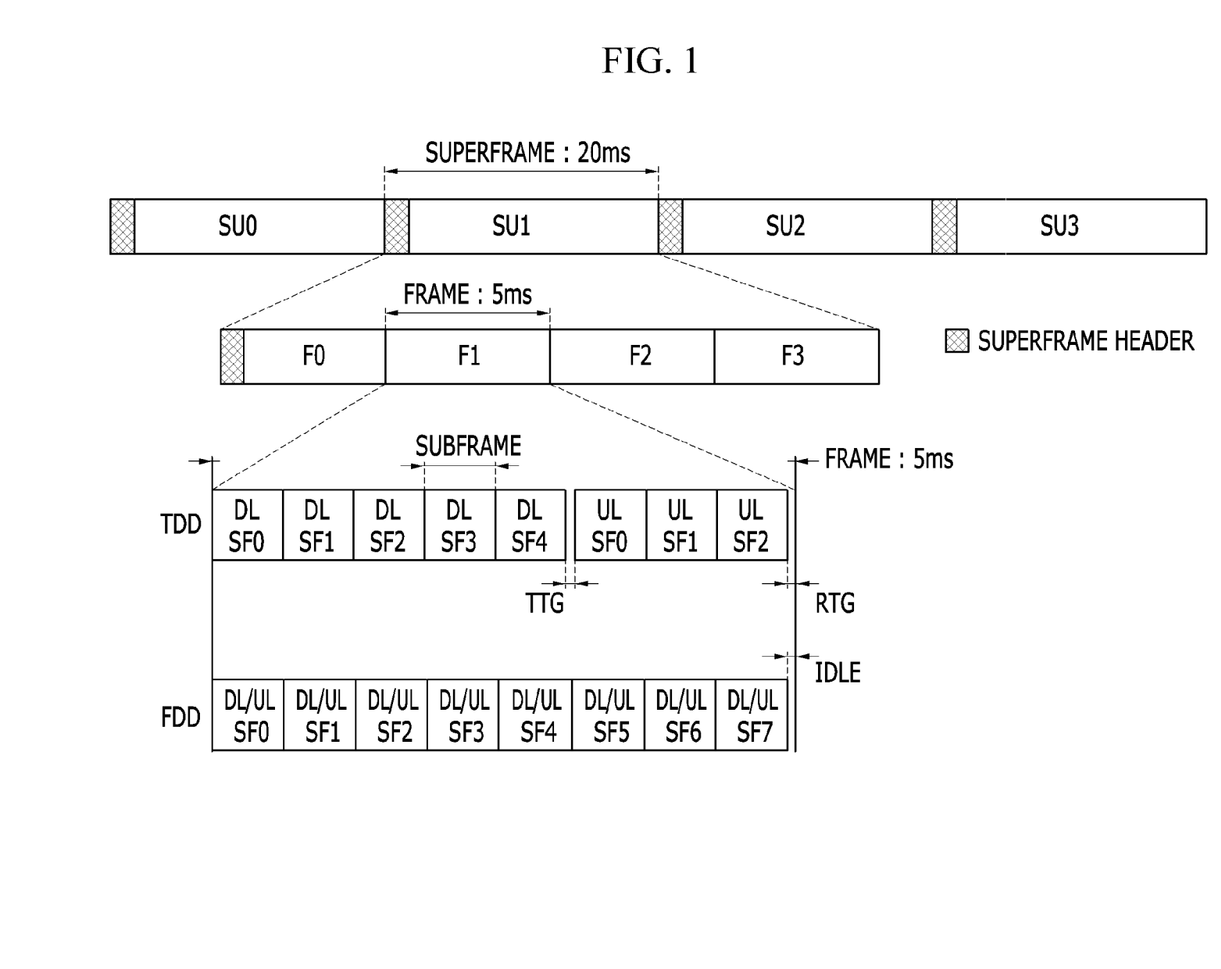
FIG. 1 is a view illustrating a frame structure of a wireless access system according to an embodiment of the present invention.

FIG. 1 is a view illustrating a frame structure of a wireless access system according to an embodiment of the present invention.

Referring to FIG. 1, a plurality of superframes SU0~SU3 are continuous, each of the superframes include a plurality of frames F0, F1, F2, and F3, and each of the frames include a plurality of subframes. A superframe heater is positioned in front of each of the superframes. FIG. 1 illustrates a structure in which one superframe includes four frames, and in case of a frequency division duplex (FDD) mode, one frame includes eight subframes, and in case of a time division duplex (TDD) mode, a ratio, i.e., D:U, of DL subframes and UL subframes is 5:3. Here, F indicates the number of subframes in the FDD mode, and D and U indicate the number of DL subframes and the number of UL subframes, respectively.

Here, in the case of the TDD mode, a plurality of subframes of the TDD frame are divided into DL subframes DSLF0~DSLF4 and UL subframes ULSF0~ULSF2. A transmit/receive transition gap (TTG) is formed between the DL subframe and the UL subframe, and a receive/transmit transition gap (RTG) is formed in the end of the TDD frame.

In the case of the FDD mode, all the subframes SF0~SF7 of the FDD frame may be used in downlink and uplink (DL/UL). An idle interval IDLE is present in the end of the FDD frame.

Table 1 below shows a configuration of subframes of a TDD frame and an FDD frame according to a channel bandwidth (BW) and a CP ratio.

TABLE 1

| CP Ratio | | Channel BW(MHz) | | |
|---|---|---|---|---|
| | | 7 | 8.75 | 5, 10, 20 |
| FDD(F) | G = 1/8 | 5 | 7 | 8 |
| | G = 1/16 | 6 | | |
| TDD(D:U) | G = 1/8 | 3:2, 2:3 | 5:2, 4:3, 3:4 | 8:0, 6:2, 5:3, 4:4, 3:5 |
| | G = 1/16 | 4:2, 3:3 | | |
| G = 1/4 FDD (F) | | 5 | 6 | 7 |
| TDD(D:U) | G = 1/4 | 3:2, 2:3 | 4:2, 3:3, 2:4 | 5:2, 4:3, 3:4 |

Next, HARQ transmission/reception timing in a general wireless access system will be described with reference to FIGS. 2 and 3.

Hereinafter, for description purposes, the FDD frame is illustrated to have a structure in which the number F of subframes is 8, and the TDD frame is illustrated to have structure in which D:U is 5:3. Also, it is assumed that a HARQ processing time of a base station (BS) and a mobile station (MS) is 3 subframes. That is, it is assumed that a process time required for the MS to receive a data packet or a MAP transmitted from the BS, decode the same, and transmit a feedback signal or a data packet to a UL is three subframes. Also, it is assumed that a process time required for the BS to receive a data packet transmitted from the MS, decode the same, and transmit a feedback signal to a DL and a processing time required for the BS to receive UL HARQ feedback with respect to the DL data packet and decode the same is three subframes.

Here, transmission/reception timing of the DL HARQ in the FDD mode and the TDD mode may be expressed as shown in Table 2 below.

TABLE 2

| | Subframe Index | Frame index |
|---|---|---|
| DL assignment signal transmission | l | i |
| DL data packet (HARQ packet) transmission | m | i |
| UL HARQ feedback transmission | n | j = (i + z) mod 4 z = 0 or 1 |

Here, a parameter l indicates a subframe index at a transmission time of an advanced MAP (A-MAP) as an assignment signal including resource allocation information, m indicates a subframe index at a transmission time of a DL data packet (HARQ subpacket), n indicates a HARQ feedback subframe index, and i and j indicate a frame index. Further, z is a fixed factor according to DL reception processing performance of the MS with respect to a DL data packet, which has a value 0 or 1. It is a factor for identifying whether a HARQ feedback transmission frame position is the same as a frame in which the DL data packet has been transmitted or whether HARQ feedback is to be transmitted in a next frame. Thus, a frame index at a UL HARQ feedback transmission time may be a position of i or (i+1)mod 4. Here, "mod" refers to a modular arithmetic operation, in which a=(x)mod(y) means that a remainder value obtained by dividing x by y is equal to a, and refers to a frame index being classified into four indices of 0 to 3.

Here, parameters l and m indicating DL subframe indices have values of 0 to F−1 in the FDD mode and 0 to D−1 in the TDD mode according to a number of DL subframes, and parameter n indicating a UL subframe index has index values of 0 to F−1 in the FDD mode and index values of 0 to U−1 in the TDD mode according to a number of UL subframes.

Figure 2:
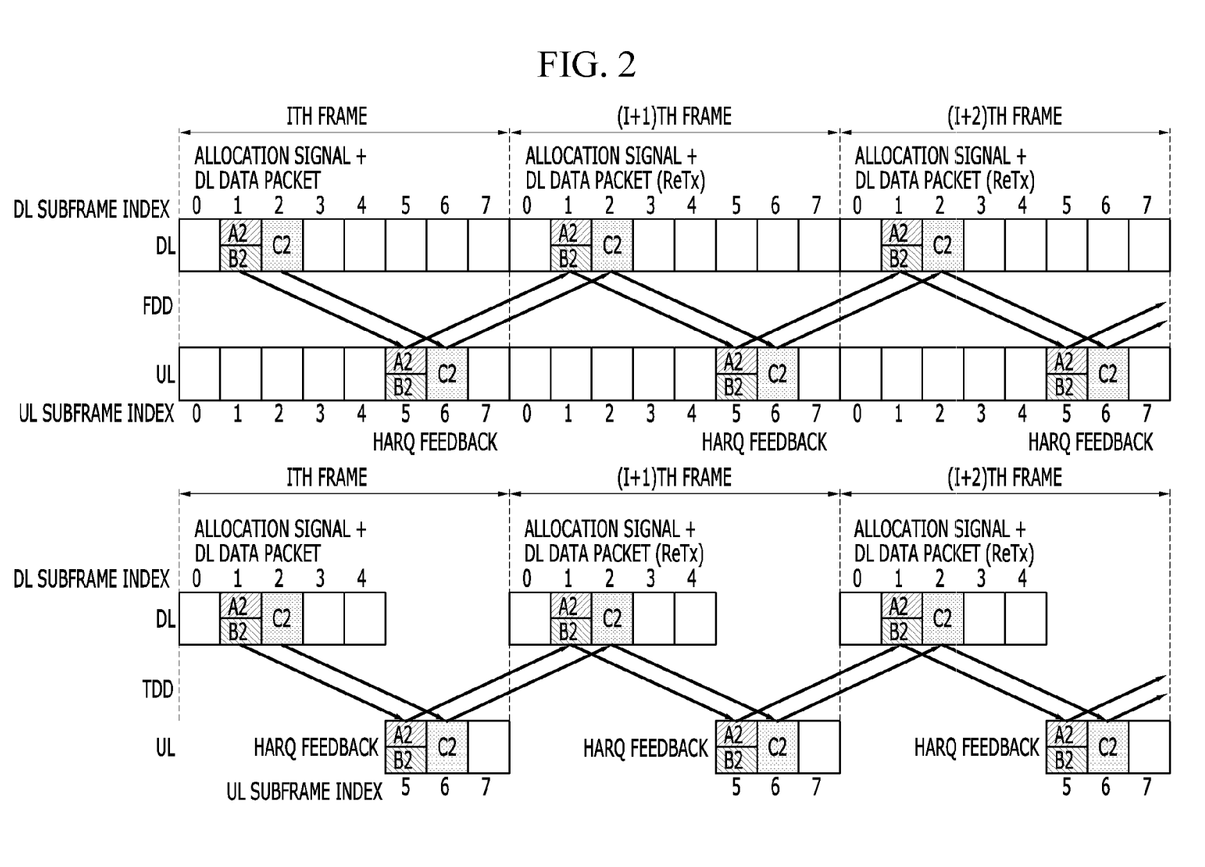
FIG. 2 is a view illustrating downlink (DL) hybrid automatic repeat request (HARQ) transmission/reception timing.

FIG. 2 is a view illustrating DL HARQ transmission/reception timing.

As described above, in FIG. 2, it is assumed that the number (F) of subframes in the FDD mode is 8, and the number (D) of DL subframes is 5 and the number (U) of UL subframes is 3 in the TDD mode, i.e., D:U=5:3 (D+U=8). Here, FIG. 2 illustrates each timing of signal processing time such as DL allocation signal transmission, DL data packet (HARQ subpacket) transmission, UL HARQ feedback transmission, and the like, based on DL HARQ timing in which HARQ feedback subframe indices correspond to n=5 (for A2, B2) and n=6 (for C2) in the FDD mode and correspond to n=0 (for A2, B2) and n=1 (for C2) in the TDD mode, in case a subframe index that is a position index in which a DL HARQ subpacket of each of DL data packets A2, B2, and C3 is transmitted is l=m=1 (for A2 and B2) or l=m=2 (for C2), and z=0.

In this manner, in the general DL HARQ transmission and reception scheme, the same type of HARQ timing procedure is applied to every DL data packet irrespective of QoS of a service flow, corresponding priority, allocation and availability or unavailability of radio resources, a system load, a HARQ buffer state, or the like.

Transmission and reception timing of the UL HARQ in the FDD mode and the TDD mode may be expressed as shown in Table 3 below. Here, retransmission of a UL data packet follows the synchronous HARQ scheme in which a UL data packet is retransmitted in the same subframe as that of a previously transmitted data packet.

TABLE 3

|  | Subframe index | Frame index |
|---|---|---|
| UL assignment signal transmission | l | i |
| UL data packet (HARQ packet) transmission (Tx) | m | $j = (i + v) \bmod 4$ <br> $v = 0$ or $1$ |
| DL HARQ feedback transmission | $n = l$ | $k = (j + w) \bmod 4$ <br> $w = 0$ or $1$ |
| UL data packet (HARQ packet) Retransmission (ReTx) | m | $p = (k + v) \bmod 4$ <br> $v = 0$ or $1$ |

Here, a parameter l indicates a subframe index at a transmission time of an advanced MAP (A-MAP) that is an assignment signal including resource allocation information, m indicates a subframe index at a transmission and retransmission time of a UL data packet (HARQ subpacket), n indicates a HARQ feedback subframe index, and i, j, k, and p indicate a frame index. Further, v is a fixed factor according to UL data packet transmission processing performance of the MS allocated to a UL allocation signal, and w is a fixed factor according to reception processing performance of a UL data packet of the BS. Each of the fixed factors have a value of 0 or 1, which indicates whether a HARQ data packet or feedback transmission frame position is the same frame position as that of a previously transmitted allocation signal transmission timing or a UL data transmission time, or a subsequent frame position.

Here, parameters l and n indicating DL subframe indices have values of 0 to F−1 in the FDD mode and 0 to D−1 in the TDD mode according to a number of DL subframes, and parameter m indicating a UL subframe index has index values of 0 to F−1 in the FDD mode and index values of 0 to U−1 in the TDD mode according to a number of UL subframes.

Figure 3:
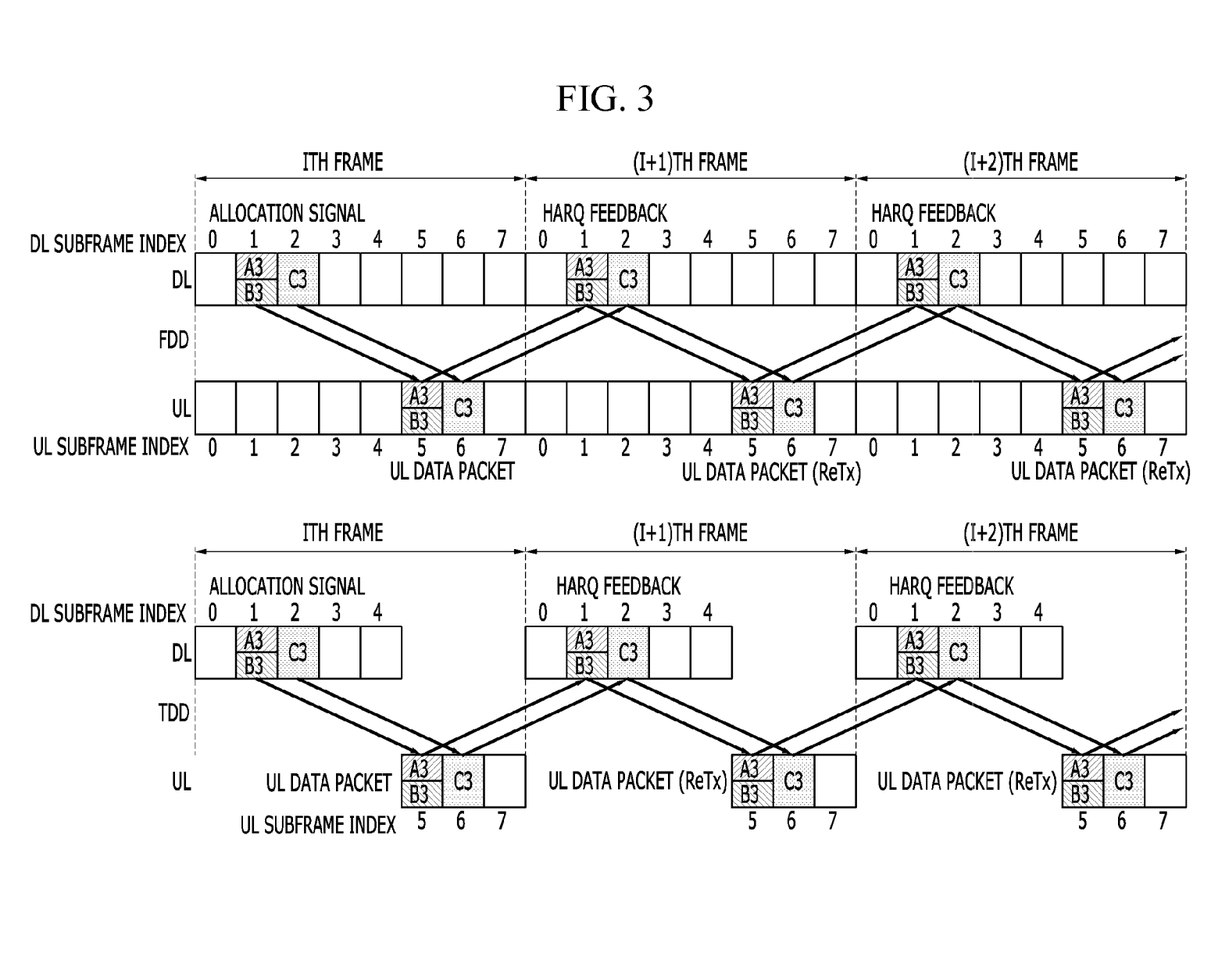
FIG. 3 is a view illustrating uplink (UL) HARQ transmission/reception timing.

FIG. 3 is a view illustrating UL HARQ transmission/reception timing.

Here, FIG. 3 illustrates each timing of signal processing time such as UL allocation signal transmission, UL data packet (HARQ subpacket) transmission, DL HARQ feedback transmission, and the like, based on UL HARQ timing in which subframe indices that are position indices in which UL HARQ data packets are transmitted correspond to m=5 (for A3, B3) and m=6 (for C3) in the FDD mode and correspond to m=0 (for A3, B3) and m=1 (for C3) in the TDD mode, and HARQ feedback subframe indices correspond to n=l=1 (for A3, B3) and n=l=2 (for C3) in an FDD/TDD mode, in case a subframe index that is a position index in which an allocation signal of each of UL data packets A3, B3, and C3 is transmitted is l=1 (for A3, B3) or l=2 (for C3) and z=0.

In this manner, in the general UL HARQ transmission and reception scheme, the same type of HARQ timing procedure is applied to every UL data packet irrespective of QoS of a service flow, corresponding priority, allocation and availability or unavailability of radio resources, a system load, a HARQ buffer state, or the like.

Hereinafter, a method for adaptively controlling a HARQ transmission and reception signal in a wireless access system according to an embodiment of the present invention will be described in detail with reference to FIGS. 4 through 9.

In the present embodiment, rather than using a HARQ transmission and reception scheme based on fixed transmission and reception timing between a base station and a mobile station, retransmission timing of a HARQ data packet and transmission and reception timing of HARQ feedback are adjusted according to a request from a base station or a request from a mobile station according to a system environment.

Figure 4:
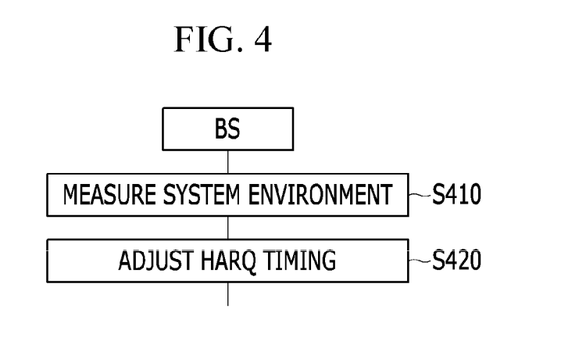
FIGS. 4 and 5 are flowcharts illustrating a method for adjusting HARQ timing according to an embodiment of the present invention.

FIG. 4 is a flowchart illustrating a method for adjusting HARQ timing according to an embodiment of the present invention.

Referring to FIG. 4, a base station (BS) measures a system environment (S410), and adjusts HARQ timing of a mobile station (MS) according to the measured system environment (S420). Here, when allocating DL/UL radio resources with respect to the adjustment-required MS, the BS may transmit transmission and reception timing of a HARQ signal including a HARQ data packet and a feedback signal to the MS. A system environment includes at least one of a configuration environment of a wireless access system, a radio channel state, QoS of a service flow, priority of a service flow, allocation of radio resourced, availability and unavailability of radio resources, a system load, and a HARQ buffer state. That is, HARQ timing may be adjusted in consideration of timing adjustment according to necessity due to adjustment of a configuration environment of a wireless access system including a BS without considering a radio channel state of an MS, or the like, a system environment of the MS, e.g., a radio channel state, QoS of a service flow, priority of a service flow, allocation of radio resources, availability and unavailability of radio resources, a system load, a HARQ buffer state, and the like.

Figure 5:
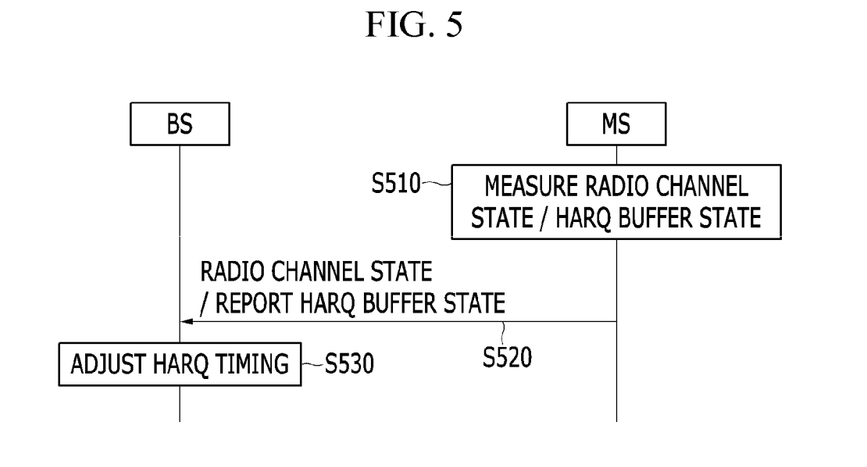

FIG. 5 is a flowchart illustrating a method for adjusting HARQ timing according to another embodiment of the present invention. That is, it corresponds to a method for adjusting HARQ timing according to a system environment between a BS and an MS.

Referring to FIG. 5, an MS measures system environment such as a radio channel state, a HARQ buffer state, and the like (S510), and reports information regarding the measured radio channel state or the HARQ buffer state to the BS (S520). The BS adjusts HARQ timing of the MS based on the reported information (S530).

Figure 6:
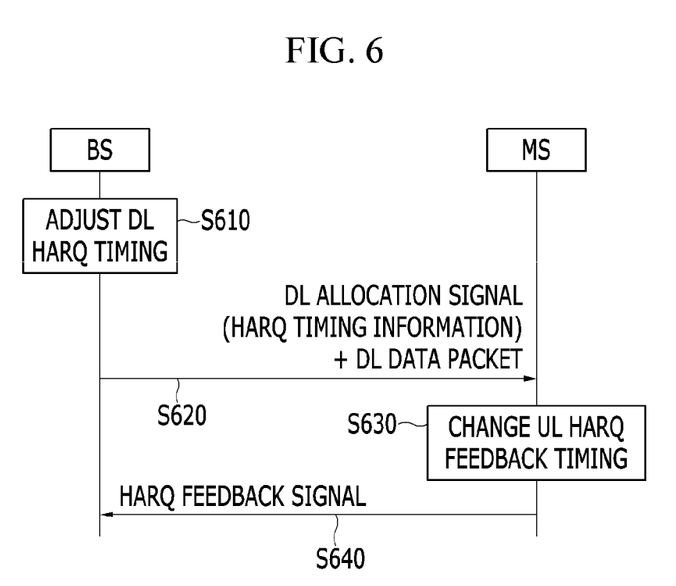
FIG. 6 is a flowchart illustrating a method for adaptively controlling transmission and reception timing of a DL HARQ signal.
Figure 7:
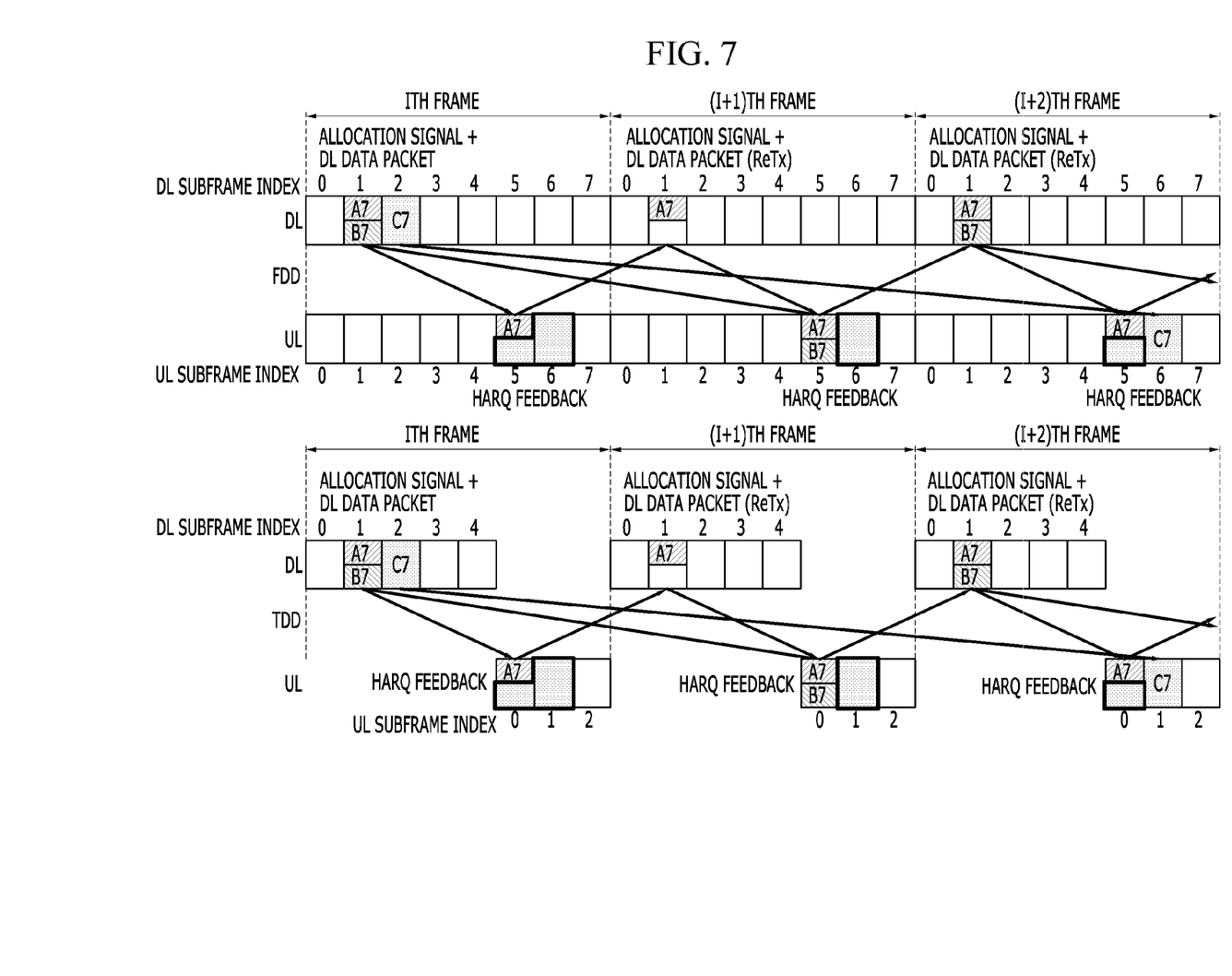
FIG. 7 is a view illustrating an example of DL HARQ transmission/reception timing according to an embodiment of the present invention.

FIG. 6 is a flowchart illustrating a method for adaptively controlling transmission and reception timing of a DL HARQ signal, and FIG. 7 is a view illustrating an example of DL HARQ transmission/reception timing according to an embodiment of the present invention.

Referring to FIG. 6, the BS adjusts DL HARQ timing (S610) and transmits a DL radio resource allocation signal including the adjusted HARQ timing information to the MS (S620). Also, the BS may transmit a DL HARQ data packet together with the DL radio resource allocation signal to the MS. Here, the HARQ timing information includes a HARQ feedback transmission timing offset α. The MS changes transmission timing by a size corresponding to the changed HARQ feedback transmission timing offset α (S630), and transmits the HARQ feedback signal to the BS according to the changed transmission timing (S640).

Table 4 below shows FDD and TDD DL HARQ transmission and reception timing in a method for adaptively controlling a DL HARQ transmission and reception signal according to an embodiment of the present invention.

TABLE 4

|  | Subframe index | Frame index |
|---|---|---|
| DL assignment signal transmission | l | i |
| DL data packet (HARQ subpacket) transmission | m | i |
| UL HARQ feedback transmission | n | J = j + α |

Here, a parameter l indicates a subframe index at a transmission time of an advanced MAP (A-MAP) that is an assignment signal including DL resource allocation information, m is a subframe index at a transmission time of a DL data packet (HARQ subpacket), n indicates a HARQ feedback subframe index, and l, j, and J indicate a frame index. Here, j indicates a frame index according to HARQ timing before being adjusted, and J indicates a frame index according to HARQ timing adjusted by α at a fixed transmission time (j).

As described above, in FIG. 7, it is assumed that the number (F) of subframes in the FDD mode is 8, and the number (D) of DL subframes is 5 and the number (U) of UL subframes is 3 in the TDD mode, i.e., D:U=5:3 (D+U=8). Here, FIG. 7 illustrates each timing of signal processing time such as DL allocation signal transmission, DL data packet (HARQ subpacket) transmission, UL HARQ feedback transmission, and the like, based on DL HARQ timing in which a HARQ feedback subframe index corresponds to n=5 (for A7, B7) and n=6 (for C7) in the FDD mode and corresponds to n=0 (for A2, B7) and n=1 (for C7) in the TDD mode, in case a subframe index that is a position index in which an allocation signal and a DL HARQ subpacket of each of DL data packets A7, B7, and C7 are transmitted is l=m=1 (for A7 and B7) or l=m=2 (for C7). Here, an example in which the HARQ feedback timing offsets α of the DL data packets A7, B7, and C7 are 0, 1, and 2, respectively, is illustrated. As illustrated in FIG. 7, the DL allocation signal, retransmission times of the HARQ data packets A7, B7, and C7, and a frame index of the HARQ feedback timing are changed by the adjusted transmission timing offset α.

In this manner, in the DL HARQ transmission and reception scheme according to an embodiment of the present invention, transmission and reception timing of a DL HARQ signal with respect to a DL data packet may be changed according to a system environment. Thus, as illustrated in FIG. 7, by securing radio resources for a HARQ feedback signal in the UL $0^{th}$ and $1^{st}$ subframes of the $i^{th}$ frame, UL $1^{st}$ subframe of the $(i+1)^{th}$ frame, and UL $0^{th}$ subframe of the $(i+2)^{th}$ frame in the TDD mode, radio resources may be preferentially allocated to a service flow having high priority. Similarly, radio resources can be secured for a HARQ data packet, so a service may be preferentially provided with respect to a service flow having high priority.

In this manner, according to an embodiment of the present invention, a timing for transmitting and receiving a HARQ signal for a DL data packet between a BS and an MS can be flexibly and adaptively adjusted according to a radio channel state, characteristics (QoS, priority, etc.) of a service flow, a HARQ buffer state, and a system load state in a wireless access system.

Figure 8:
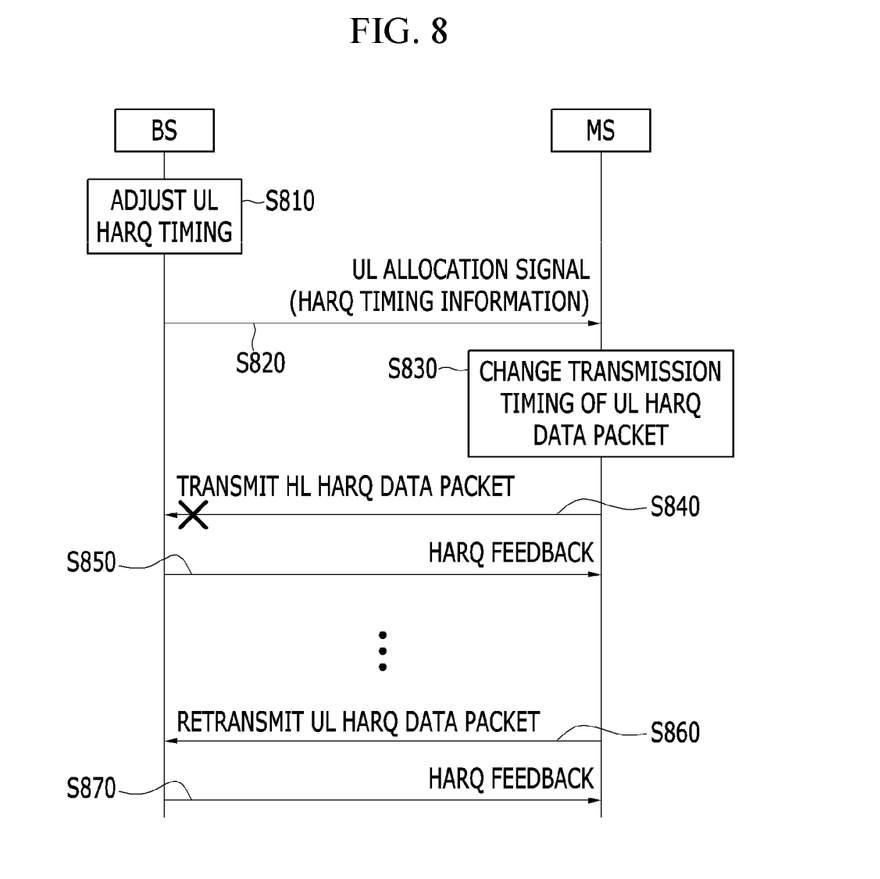
FIG. 8 is a flowchart illustrating a method for adaptively controlling transmission and reception timing of a UL HARQ signal according to an embodiment of the present invention.
Figure 9:
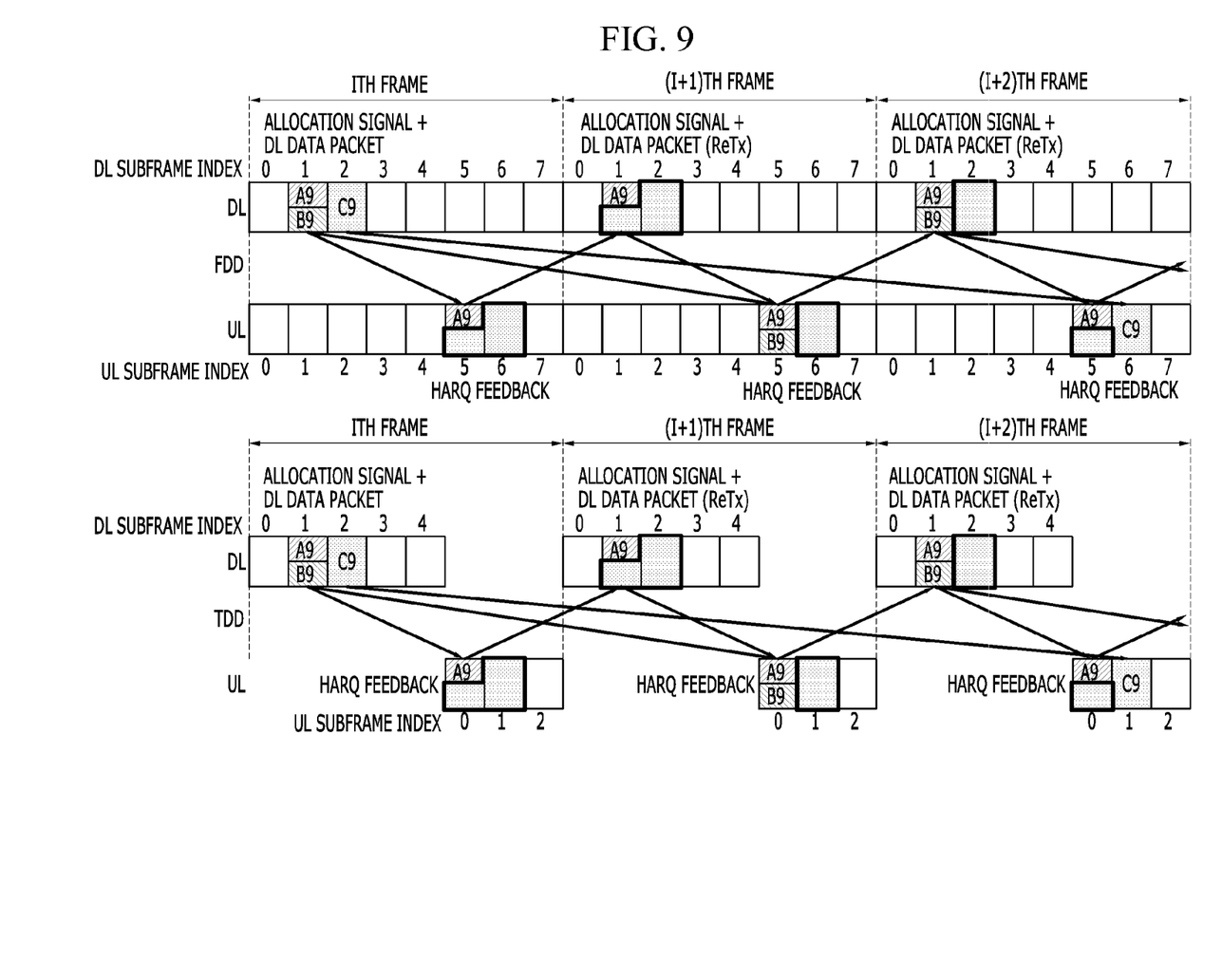
FIG. 9 is a view illustrating an example of UL HARQ transmission and reception timing according to an embodiment of the present invention.

FIG. 8 is a flowchart illustrating a method for adaptively controlling transmission and reception timing of a UL HARQ signal according to an embodiment of the present invention, and FIG. 9 is a view illustrating an example of UL HARQ transmission and reception timing according to an embodiment of the present invention.

Referring to FIG. 8, the BS adjusts UL HARQ timing (S810), and transmits a UL radio resource allocation signal including the adjusted HARQ timing information to the corresponding MS (S820). Here, the HARQ timing information includes a HARQ transmission timing offset β. The MS changes transmission timing by a size corresponding to the adjusted HARQ transmission timing offset β (S830), and transmits a UL HARQ data packet to the BS according to the changed transmission timing (S840). Here, when the BS fails to decode the corresponding UL data packet, the BS transmits decoding failure information to the MS through a HARQ feedback signal (S850). Then, the MS repeatedly retransmits a UL HARQ data packet by applying the adjusted HARQ transmission timing offset β until the UL HARQ data packet is successfully transmitted (S860, S870).

Table 5 below shows FDD and TDD UL HARQ transmission and reception timing in the method for adaptively controlling a UL HARQ transmission and reception signal according to an embodiment of the present invention.

TABLE 5

|  | Subframe index | Frame index |
|---|---|---|
| UL assignment signal transmission | l | i |
| UL data packet (HARQ subpacket) transmission (Tx) | m | J = j + β |
| DL HARQ feedback transmission | n = l | k |
| UL data packet (HARQ subpacket) Retransmission (ReTx) | m | P = p + β |

Here, a parameter l indicates a subframe index at a transmission time of an advanced MAP (A-MAP) as an assignment signal including UL resource allocation information, m indicates a subframe index at a transmission time of a UL data packet (HARQ subpacket), and n indicates a HARQ feedback subframe index, and a subframe index at a UL data packet retransmission time is the same as m that is a transmission time of an initial data packet. Here, i, J, k, and P indicate frame indices, j, k, and p are frame indices according to HARQ timing before being adjusted, and J and P are frame indices according to HARQ timing adjusted by β from fixed transmission timings (j, p).

As described above, in FIG. 9, it is assumed that the number (F) of subframes in the FDD mode is 8, and the number (D) of DL subframes is 5 and the number (U) of UL subframes is 3 in the TDD mode, i.e., D:U=5:3 (D+U=8). Here, FIG. 9 illustrates each timing of signal processing time such as UL allocation signal transmission, UL data packet (HARQ subpacket) transmission, DL HARQ feedback transmission, and the like, based on UL HARQ timing in which subframe indices that are position indices in which UL HARQ data packets are transmitted correspond to m=5 (for A9, B9) and m=6 (for C9) in the FDD mode and correspond to m=0 (for A9, B9) and m=1 (for C9) in the TDD mode, and HARQ feedback subframe indices correspond to n=l=1 (for A9, B9) and n=l=2 (for C9) in the FDD/TDD mode, in case a subframe index that is a position index in which an allocation signal of each of UL data packets A9, B9, and C9 is transmitted is l=1 (for A9, B9) or l=2 (for C9). Here, an example in which HARQ feedback timing offsets β of the HARQ data packets A9, B9, and C9 are 0, 1, and 2, respectively, is illustrated. As illustrated in FIG. 9, the transmission times and the retransmission times of the HARQ data packets A9, B9, and C9 and frame indices of the HARQ feedback timing are changed by the adjusted transmission timing offset β.

In this manner, in the UL HARQ transmission and reception scheme according to an embodiment of the present invention, transmission and reception timing of a UL HARQ signal with respect to a UL data packet may be changed according to a system environment. Thus, as illustrated in FIG. 9, by securing radio resources for UL HARQ data packet transmission in the UL $0^{th}$ and $1^{st}$ subframes of the $i^{th}$ frame, the UL $1^{st}$ subframe of the $(i+1)^{th}$ frame, and the UL $0^{th}$ subframe of the $(i+2)^{th}$ frame in the TDD mode, radio resources may be preferentially allocated to a service flow having high priority. Similarly, radio resource can be secured for a HARQ feedback signal, so a service may be preferentially provided with respect to a service flow having high priority.

In this manner, according to an embodiment of the present invention, timing for transmitting and receiving a HARQ signal for a UL data packet between a BS and an MS can be flexibly and adaptively adjusted according to a radio channel state, characteristics (QoS, priority, etc.) of a service flow, a HARQ buffer state, and a system load state in a wireless access system.

Hereinafter, an apparatus for adjusting HARQ timing which performs a method for adjusting HARQ timing according to an embodiment of the present invention will be described with reference to FIGS. 10 and 11.

Figure 10:
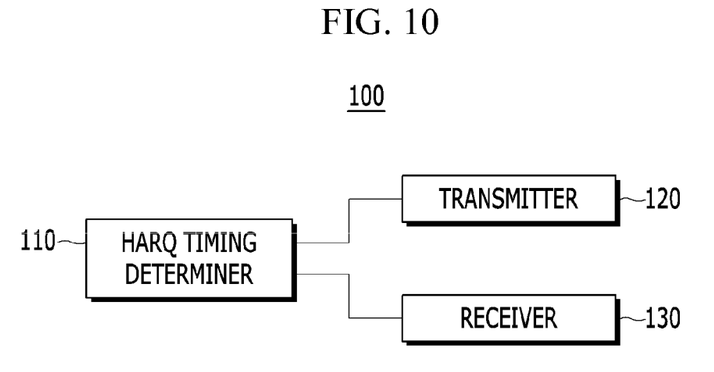
FIGS. 10 and 11 are block diagrams of an apparatus for adjusting HARQ timing according to an embodiment of the present invention.
Figure 11:
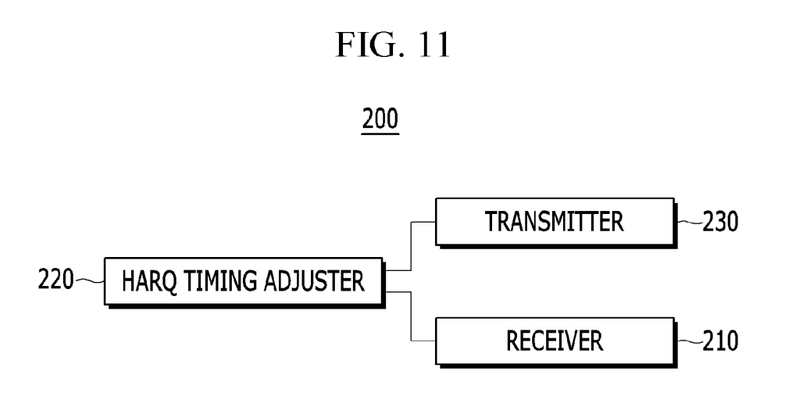

FIGS. 10 and 11 are block diagrams of an apparatus for adjusting HARQ timing according to an embodiment of the present invention.

Referring to FIG. 10, the apparatus 100 for adjusting HARQ timing includes a HARQ timing determiner 110, a transmitter 120, and a receiver 130. The apparatus 100 for adjusting HARQ timing may be formed in a base station (BS), or may be a BS itself.

The HARQ timing determiner 110 adjusts HARQ timing of an MS based on a system environment measured by a BS or system environment information reported by the MS. The transmitter 120 transmits an allocation signal including the adjusted HARQ timing information to the corresponding MS. The MS adjusts HARQ timing according to the HARQ timing information and transmits a HARQ signal, and the receiver 130 receives the HARQ signal transmitted from the MS.

Here, when the allocation signal is a DL radio resource allocation signal, the HARQ signal includes a HARQ feedback signal with respect to a DL HARQ data packet transmitted from the transmitter 120. Meanwhile, when the allocation signal is a UL radio resource allocation signal, the HARQ signal includes a UL HARQ data packet transmitted or retransmitted by the MS, and the transmitter 120 transmits a HARQ feedback signal with respect to the UL HARQ data packet to the MS.

Referring to FIG. 11, an apparatus 200 for adjusting HARQ timing includes a receiver 210, a HARQ timing adjuster 220, and a transmitter 230. The apparatus 200 for adjusting HARQ timing may be formed in a base station (BS), or may be a BS itself.

The receiver 210 receives an allocation signal including HARQ timing information adjusted by a BS according to a system environment, from the BS. The HARQ timing adjuster 220 adjusts HARQ timing to the HARQ timing information, and the transmitter 230 transmits a HARQ signal to the BS according to the adjusted HARQ timing. The transmitter 230 may measure a system environment and report the same to the BS to allow the BS to determine HARQ timing. Alternatively, the BS may directly measure a system environment and determine HARQ timing.

Here, when the allocation signal is a DL radio resource allocation signal, the HARQ signal includes a HARQ feedback signal with respect to a DL HARQ data packet received by the receiver 210. Meanwhile, when the allocation signal is a UL radio resource allocation signal, the HARQ signal includes a UL HARQ data packet transmitted or retransmitted by the MS, and the receiver 210 receives a HARQ feedback signal with respect to the UL HARQ data packet from the BS.

In FIG. 10 and FIG. 11, the HARQ timing determiner 110 or the HARQ timing adjuster 220 may be embodied by one or more processors, and the transmitter 120/230 and the receiver 130/210 may be embodied by one or more transceiver.

As described above, according to an embodiment of the present invention, a time at which a HARQ signal is transmitted and received may be flexibly and adaptively adjusted according to a radio channel state, characteristics (QoS, priority, and the like) of a service flow, a HARQ buffer state, and a system load state in a wireless access system.

According to another embodiment of the present invention, radio resources may be preferentially allocated to a service flow having high priority by securing radio resources for HARQ signal transmission.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of adjusting hybrid automatic repeat request (HARQ) timing by a base station, the method comprising:
   adjusting HARQ timing of a mobile station according to a system environment;
   transmitting a radio resource allocation signal including the adjusted HARQ timing information; and
   receiving from the mobile station a HARQ signal transmitted according to the HARQ timing information,
   wherein the radio resource allocation signal includes downlink radio resource allocation information, and the HARQ signal includes a HARQ feedback signal with respect to a downlink HARQ data packet,
   wherein the HARQ timing information includes a transmission timing offset, and the HARQ feedback signal is transmitted in a frame having a frame index changed by the transmission timing offset from a frame index of a transmission time before being adjusted.

2. The method of claim 1, further comprising measuring, by the base station, the system environment.

3. The method of claim 1, further comprising receiving information regarding the system environment measured by the mobile station from the mobile station.

4. A method of adjusting hybrid automatic repeat request (HARQ) timing by a mobile station, the method comprising:
   receiving from a base station a radio resource allocation signal including HARQ timing information that is adjusted according to a system environment;
   adjusting HARQ timing according to the HARQ timing information; and
   transmitting to the base station a HARQ signal according to the adjusted HARQ timing,
   wherein the radio resource allocation signal includes downlink radio resource allocation information, and the HARQ signal includes a HARQ feedback signal with respect to a downlink HARQ data packet,
   wherein the HARQ timing information includes a transmission timing offset, and the mobile station transmits the HARQ feedback signal in a frame having a frame index that is changed by the transmission timing offset from a frame index of a transmission time before being adjusted.

5. The method of claim 4, wherein the system environment is measured by the base station.

6. The method of claim 4, further comprising:
measuring the system environment; and
transmitting information regarding the system information to the base station.

7. An apparatus for adjusting hybrid automatic repeat request (HARQ) timing, the apparatus comprising:
a HARQ timing determiner configured to adjust HARQ timing of a mobile station;
a transmitter configured to transmit a downlink radio resource allocation signal including the adjusted HARQ timing information and a downlink HARQ data packet to the mobile station; and
a receiver configured to receive a HARQ feedback signal with respect to the downlink data packet that is transmitted according to the adjusted HARQ timing information from the mobile station,
wherein the adjusted HARQ timing information includes a transmission timing offset, and the HARQ feedback signal is transmitted in a frame having a frame index changed by the transmission timing offset from a frame index of a transmission time before being adjusted.

8. An apparatus for adjusting hybrid automatic repeat request (HARQ) timing, the apparatus comprising:
a receiver configured to receive a downlink radio resource allocation signal including HARQ timing information adjusted according to a system environment, and a downlink HARQ data packet from a base station;
a HARQ timing adjuster configured to adjust HARQ timing according to the HARQ timing information; and
a transmitter configured to transmit to the base station a HARQ feedback signal with respect to the downlink HARQ data packet according to the HARQ timing,
wherein the adjusted HARQ timing information includes a transmission timing offset, and the HARQ feedback signal is transmitted in a frame having a frame index changed by the transmission timing offset from a frame index of a transmission time before being adjusted.

* * * * *